United States Patent
Sivakumar et al.

(10) Patent No.: US 11,551,552 B2
(45) Date of Patent: Jan. 10, 2023

(54) DISTRIBUTING PROCESSING RESOURCES ACROSS LOCAL AND CLOUD-BASED SYSTEMS WITH RESPECT TO AUTONOMOUS NAVIGATION

(71) Applicant: GM Global Technology Operations LLC, Detroit, MI (US)

(72) Inventors: Ashiwan Sivakumar, Pittsburgh, PA (US); Fan Bai, Ann Arbor, MI (US); Peter Steenkiste, Pittsburgh, PA (US)

(73) Assignees: GM GLOBAL TECHNOLOGY OPERATIONS LLC, Detroit, MI (US); CARNEGIE MELLON UNIVERSITY, Pittsburgh, PA (US)

( * ) Notice: Subject to any disclaimer, the term of this patent is extended or adjusted under 35 U.S.C. 154(b) by 713 days.

(21) Appl. No.: 16/518,907

(22) Filed: Jul. 22, 2019

(65) Prior Publication Data
US 2020/0035099 A1 Jan. 30, 2020

Related U.S. Application Data

(60) Provisional application No. 62/711,932, filed on Jul. 30, 2018.

(51) Int. Cl.
| | |
|---|---|
| *G08G 1/0968* | (2006.01) |
| *G08G 1/00* | (2006.01) |
| *G05D 1/00* | (2006.01) |
| *G05D 1/02* | (2020.01) |
| *G08G 1/056* | (2006.01) |

(52) U.S. Cl.
CPC ..... *G08G 1/096827* (2013.01); *G05D 1/0088* (2013.01); *G05D 1/0212* (2013.01); *G08G 1/056* (2013.01); *G08G 1/22* (2013.01); *G05D 2201/0213* (2013.01)

(58) Field of Classification Search
CPC .... G08G 1/096827; G08G 1/056; G08G 1/22; G08G 1/096811; G05D 1/0088; G05D 1/0212; G05D 2201/0213; G06F 2209/509; G06F 9/5027; G01C 21/3415
See application file for complete search history.

(56) References Cited

U.S. PATENT DOCUMENTS

| | | | | |
|---|---|---|---|---|
| 2008/0262718 | A1* | 10/2008 | Farwell | G05D 1/0244 701/445 |
| 2015/0378361 | A1* | 12/2015 | Walker | G06T 7/194 114/343 |
| 2018/0068163 | A1* | 3/2018 | Malecki | G05D 1/0206 |
| 2019/0197339 | A1* | 6/2019 | Han | H04N 21/4424 |

(Continued)

*Primary Examiner* — Thomas Ingram
(74) *Attorney, Agent, or Firm* — Cantor Colburn LLP

(57) ABSTRACT

Embodiments herein include a method executable by a processor coupled to a memory. The processor is local to a vehicle can operable to determine initial location and direction information associated with the vehicle at an origin of a trip request. The processor receives one or more frames captured while the vehicle is traveling along a navigable route relative to the trip request and estimates an execution time for each of one or more computations respective to an analyzing of the one or more frames. The processor, also, off-loads the one or more computations to processing resources of a cloud-based system that is in communication with the processor of the vehicle in accordance with the corresponding execution times.

20 Claims, 8 Drawing Sheets

(56) References Cited

U.S. PATENT DOCUMENTS

| | | | |
|---|---|---|---|
| 2019/0220997 A1* | 7/2019 | Asai | G06T 7/73 |
| 2019/0271549 A1* | 9/2019 | Zhang | G06F 16/29 |
| 2020/0134866 A1* | 4/2020 | Kitaura | G06T 7/70 |
| 2020/0167195 A1* | 5/2020 | Aronovich | G06F 9/5072 |
| 2020/0225673 A1* | 7/2020 | Ebrahimi Afrouzi | G05D 1/0016 |
| 2021/0271517 A1* | 9/2021 | Guim Bernat | G06N 3/08 |
| 2022/0003562 A1* | 1/2022 | Mack | G08G 1/127 |
| 2022/0063096 A1* | 3/2022 | Ju | B25J 9/1664 |
| 2022/0074056 A1* | 3/2022 | Nalladega | F01D 5/288 |

* cited by examiner

| 401 | 402 | 403 | 404 |
|---|---|---|---|
| 410 | 48.34% (14.02s/29s) | O(I) | Real-time |
| 420 | 82% (24.05s/29s) | O(m^3)sub-map | 1 fame duration |
| 430 | 0.98%(.0284s/29s) | O(I) ~ 5 Key | No deadline |
| 440 | 0.5%(.14s/29s) | O(I) ~ 10 Key | No deadline |
| 450 | 0.516 seconds | O(Edges) – 100 edges | No deadline |
| 460 | 12.53 seconds | O(M, K) – 20 iterations | No deadline |

FIG. 4

DISTRIBUTING PROCESSING RESOURCES ACROSS LOCAL AND CLOUD-BASED SYSTEMS WITH RESPECT TO AUTONOMOUS NAVIGATION

CROSS REFERENCE TO RELATED APPLICATION

This application claims the benefit of U.S. Provisional Patent Application Ser. No. 62/711,932 filed Jul. 30, 2018 which is incorporated herein by reference in its entirety.

INTRODUCTION

The disclosure relates to autonomous navigation, and more specifically to distributing processing resources across local and cloud-based systems with respect to autonomous navigation.

Autonomous vehicles are automobiles that have the ability to operate and navigate without human input. Autonomous vehicles, as well as some non-autonomous vehicles, use sensors (e.g., cameras, radar devices, light detection and ranging devices), global positioning systems (GPSs), and computer vision in combination with computer control systems of the autonomous vehicles to derive sensory input information and detect autonomous vehicle surroundings. Further, advanced computer control systems of the autonomous vehicles can interpret the sensory input information to identify appropriate navigation paths, as well as obstacles and relevant signage. Some autonomous vehicles update geographic map information in real-time to remain aware of the autonomous vehicle's location even if conditions change or the autonomous vehicle enters an uncharted environment.

In support of operations and navigation without human input, autonomous vehicles can also employ a simultaneous localization and mapping (SLAM) or variations thereof. SLAM enables the autonomous vehicles to contemporaneously create a "map" from an image and to orient themselves in real-time while traveling. The map, in this context, may be referred to as a set of features distributed within the image. SLAM also enables the autonomous vehicles to use pre-existing maps in conjunction with the contemporaneously created maps to orient themselves. In some cases, global positioning system data can supplement the orientation determination by the autonomous vehicles.

However, image analyzation by SLAM is a processor intensive operation, especially while the autonomous vehicles are moving. Further, because noise is introduced by the movement of the autonomous vehicles and by inaccuracies within the image analyzation, the autonomous vehicles can have difficulty orienting themselves. Furthermore, due to the intensity of the processor operations, the autonomous vehicles can be prevented from executing other necessary tasks due to a lack of processing resources. Accordingly, it is desirable to provide a system that can utilize the benefits of SLAM while reducing a demand on the computer control systems local to an autonomous vehicle.

SUMMARY

In accordance with one or more embodiments, a method executable by a processor coupled to a memory is provided. The processor is local to a vehicle can operable to determine initial location and direction information associated with the vehicle at an origin of a trip request. The processor receives one or more frames captured while the vehicle is traveling along a navigable route relative to the trip request and estimates an execution time for each of one or more computations respective to an analyzing of the one or more frames. The processor, also, off-loads the one or more computations to processing resources of a cloud-based system that is in communication with the processor of the vehicle in accordance with the corresponding execution times.

In accordance with one or more embodiments or the method embodiment above, the off-loading of the one or more computations can include detecting a bandwidth of a connection between the cloud-based system and the processor of the vehicle. The off-loading of the one or more computations can also include off-loading the one or more computations to the processing resources in accordance with the bandwidth.

In accordance with one or more embodiments or any of the method embodiments above, the analyzing of the one or more frames can include extracting a feature set on a per frame basis to determine progressive location and direction information associated with the vehicle.

In accordance with one or more embodiments or any of the method embodiments above, the off-loading can be adaptive in accordance with the analyzing of the one or more frames.

In accordance with one or more embodiments or any of the method embodiments above, the method can include receiving, as an input, the trip request including the navigable route from the origin to a destination.

In accordance with one or more embodiments or any of the method embodiments above, the method can include determining the initial location and direction information associated with the vehicle based on an analysis of a frame captured at the origin of the trip request.

In accordance with one or more embodiments or any of the method embodiments above, the method can include determining from the one or more frames that at least a portion of the navigable route has been previously traveled by the vehicle.

In accordance with one or more embodiments, a computer program product including a computer readable storage medium having program instructions embodied therewith is provided. The program instructions are executable by a processor coupled to a memory. The processor is local to a vehicle. The program instructions are executable by the processor to cause operations including determining initial location and direction information associated with the vehicle at an origin of a trip request. The operations include receiving one or more frames captured while the vehicle is traveling along a navigable route relative to the trip request and estimating an execution time for each of one or more computations respective to an analyzing of the one or more frames. The operations also include off-loading the one or more computations to processing resources of a cloud-based system that is in communication with the processor of the vehicle in accordance with the corresponding execution times.

In accordance with one or more embodiments or the computer program product embodiment above, the off-loading of the one or more computations can include detecting a bandwidth of a connection between the cloud-based system and the processor of the vehicle. The off-loading of the one or more computations can also include off-loading the one or more computations to the processing resources in accordance with the bandwidth.

In accordance with one or more embodiments or any of the computer program product embodiments above, the analyzing of the one or more frames can include extracting a feature set on a per frame basis to determine progressive location and direction information associated with the vehicle.

In accordance with one or more embodiments or any of the computer program product embodiments above, the off-loading can be adaptive in accordance with the analyzing of the one or more frames.

In accordance with one or more embodiments or any of the computer program product embodiments above, the program instructions can be executable by the processor to cause operations that include receiving, as an input, the trip request including the navigable route from the origin to a destination.

In accordance with one or more embodiments or any of the computer program product embodiments above, the program instructions can be executable by the processor to cause operations that include determining the initial location and direction information associated with the vehicle based on an analysis of a frame captured at the origin of the trip request.

In accordance with one or more embodiments or any of the computer program product embodiments above, the program instructions can be executable by the processor to cause operations that include determining from the one or more frames that at least a portion of the navigable route has been previously traveled by the vehicle.

In accordance with one or more embodiments, a system including a processor and a memory storing program instructions thereon is provided. The program instructions are executable by the processor to cause the system to perform determining initial location and direction information associated with the vehicle at an origin of a trip request. The program instructions are executable by the processor to cause the system to perform receiving one or more frames captured while the vehicle is traveling along a navigable route relative to the trip request and estimating an execution time for each of one or more computations respective to an analyzing of the one or more frames. The program instructions, also, are executable by the processor to cause the system to perform off-loading the one or more computations to processing resources of a cloud-based system that is in communication with a system of the vehicle that comprises the processor in accordance with the corresponding execution times.

In accordance with one or more embodiments or the system above, the off-loading of the one or more computations can include detecting a bandwidth of a connection between the cloud-based system and the processor of the vehicle. The off-loading of the one or more computations can also include off-loading the one or more computations to the processing resources in accordance with the bandwidth.

In accordance with one or more embodiments or any of the system embodiments above, the analyzing of the one or more frames can include extracting a feature set on a per frame basis to determine progressive location and direction information associated with the vehicle.

In accordance with one or more embodiments or any of the system embodiments above, the off-loading can be adaptive in accordance with the analyzing of the one or more frames.

In accordance with one or more embodiments or any of the system embodiments above, the program instructions can be executable by the processor to cause the system to perform receiving, as an input, the trip request including the navigable route from the origin to a destination.

In accordance with one or more embodiments or any of the system embodiments above, the program instructions can be executable by the processor to cause the system to perform determining the initial location and direction information associated with the vehicle based on an analysis of a frame captured at the origin of the trip request.

In accordance with one or more embodiments or any of the system embodiments above, the program instructions can be executable by the processor to cause the system to perform determining from the one or more frames that at least a portion of the navigable route has been previously traveled by the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 4 depicts a table 400 of computation costs used to implement the method of FIG. 3 according to one or more embodiments;

DETAILED DESCRIPTION

Figure 1:
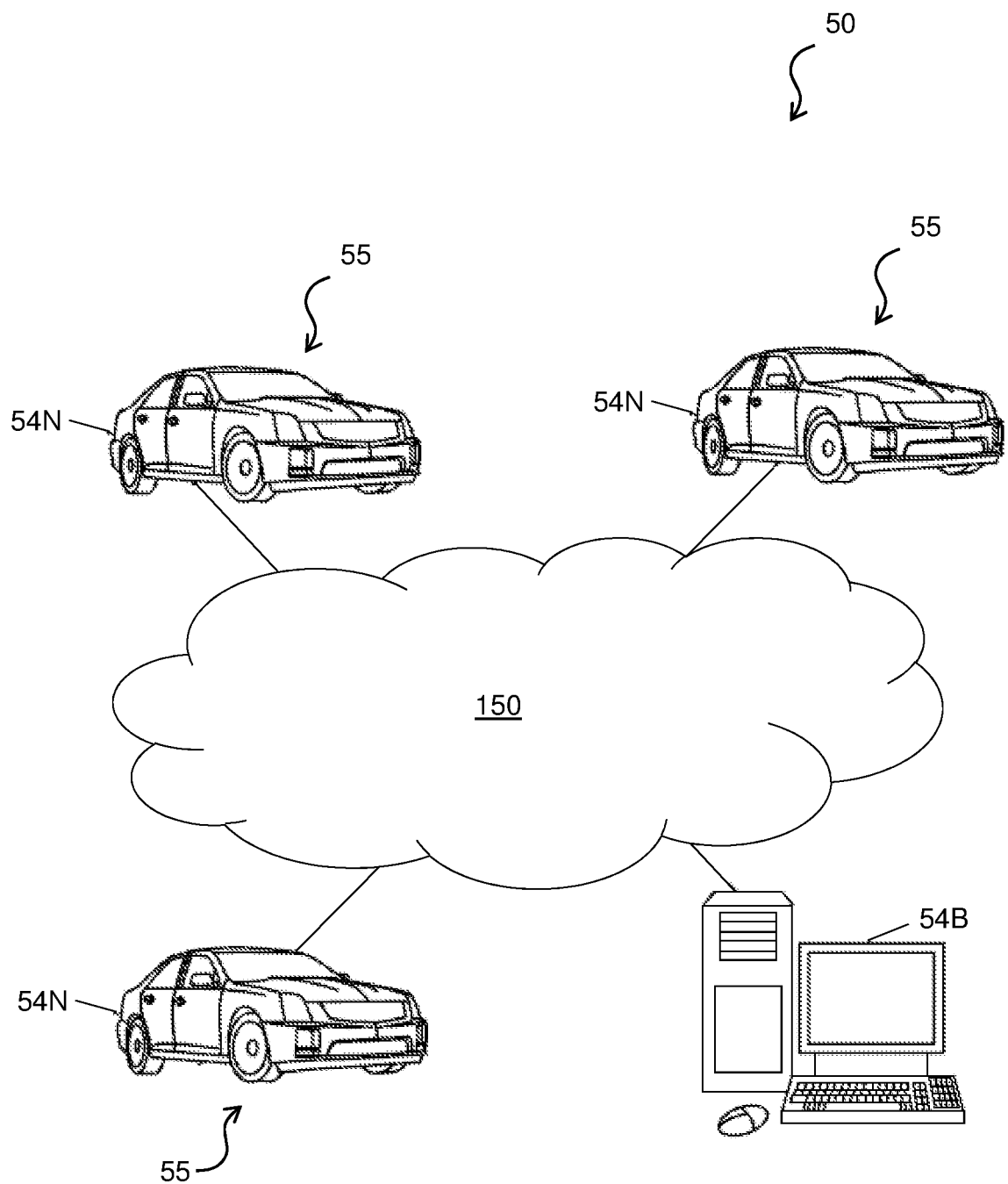
FIG. 1 is a computing environment according to one or more embodiments.

The present disclosure is merely exemplary in nature and is not intended to be limiting, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments herein relate to improving a precision of simultaneous localization and mapping (SLAM) for a vehicle with respect to a navigable route. For instance, when a trip request for the navigable route is received, a location (e.g., physical origin and/or coordinates) and direction (e.g., which way a vehicle is heading) is used orient the vehicle with respect to the trip request. Then, as the vehicle progresses along the navigable route, computations can be maintained by a processing system of the vehicle, shared between the processing system of the vehicle and a cloud based system, or fully off-loaded to the cloud based system in accordance with a computation time, bandwidth, availability of local and remote resources, etc. For instance, components of SLAM that do not have latency deadlines can be offloaded to the cloud based system, while other components with continuous compute costs are run in the vehicle. Thus, an application can be partitioned between the vehicle and the cloud based system.

In accordance with one or more embodiments, FIG. 1 illustrates a computing environment 50. As shown, computing environment 50 comprises one or more computing devices, for example, a server/Cloud 54B and/or an automobile onboard computer system 54N incorporated into each of a plurality of autonomous or non-autonomous vehicles 55, which are connected via network 150. The one or more computing devices can communicate with one another using network 150. The server/Cloud 54B is illustrative of cloud based systems that provide processing resources to the processing system of the vehicle 55, which are illustrated by the automobile onboard computer system 54N. Processing resources can include, but are not limited to, central processing units (CPUs), graphic processing units (GPUs), field-programmable gate arrays (FPGAs), etc.

The network 150 can be, for example, a cellular network, a local area network (LAN), a wide area network (WAN), such as the Internet and Wi-Fi, a dedicated short range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. The network 150 can be any combination of connections and protocols that will support communication between server/Cloud 54B, and/or the plurality of vehicle on-board computer systems 54N, respectively. The coordination between the server/cloud 54B and the vehicle on-board computer system 54N can occur using, cellular or WIFI, communications to transfer image data, key frames, position data and trip data between the vehicle 55 and the remote resource. The coordination between the server/cloud 54B and the vehicle on-board computer system 54N enables the vehicle on-board computer system 54N to perform SLAM operations that have latency deadlines, while allowing the server/cloud 54B to perform the operations that do not have latency deadlines.

The vehicle on-board computer systems 54N for each of the plurality of vehicles 55 can include a GPS transmitter/receiver (not shown) which is operable for receiving location signals from a plurality of GPS satellites (not shown) that provide signals representative of a location for each of the mobile resources, respectively. In addition to the GPS transmitter/receiver, each vehicle 55 associated with one of the plurality of vehicle on-board computer systems 54N may include a navigation processing system that can be arranged to communicate with a server/Cloud 54B through the network 150. Accordingly, each vehicle 55 associated with one of the plurality of vehicle on-board computer systems 54N is able to determine location information and transmit that location information to the server/Cloud 54B or another vehicle on-board computer system 54N.

A vehicle on-board computer system 54N may also include one or more active and passive sensors (e.g., radar, LIDAR, cameras (internal and external), weather, longitudinal acceleration, voice recognition, or the like). The vehicle on-board computer system 54N may also include one or more microphones and a speech processing application.

Additional signals sent and received may include data (e.g., image data obtained from cameras associated with the vehicle on-board computer system 54N), communication, and/or other propagated signals (e.g., signals associated with LIDAR and/or radar). Further, it should be noted that the functions of transmitter and receiver can be combined into a signal transceiver.

The vehicle on-board computer system 54N and server/Cloud 54B may both include memory components that store high-definition feature set data and can also include processing components that process the high-definition map data. For example, each vehicle 55 can store high-definition feature set data within a non-volatile memory. The vehicle on-board computer system 54N and server/Cloud 54B may both store the same or similar information related to the feature set data and routing information.

The server/Cloud 54B can serve as a remote compute resource (e.g., a server and/or a cloud system, including an edge cloud). The server/Cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
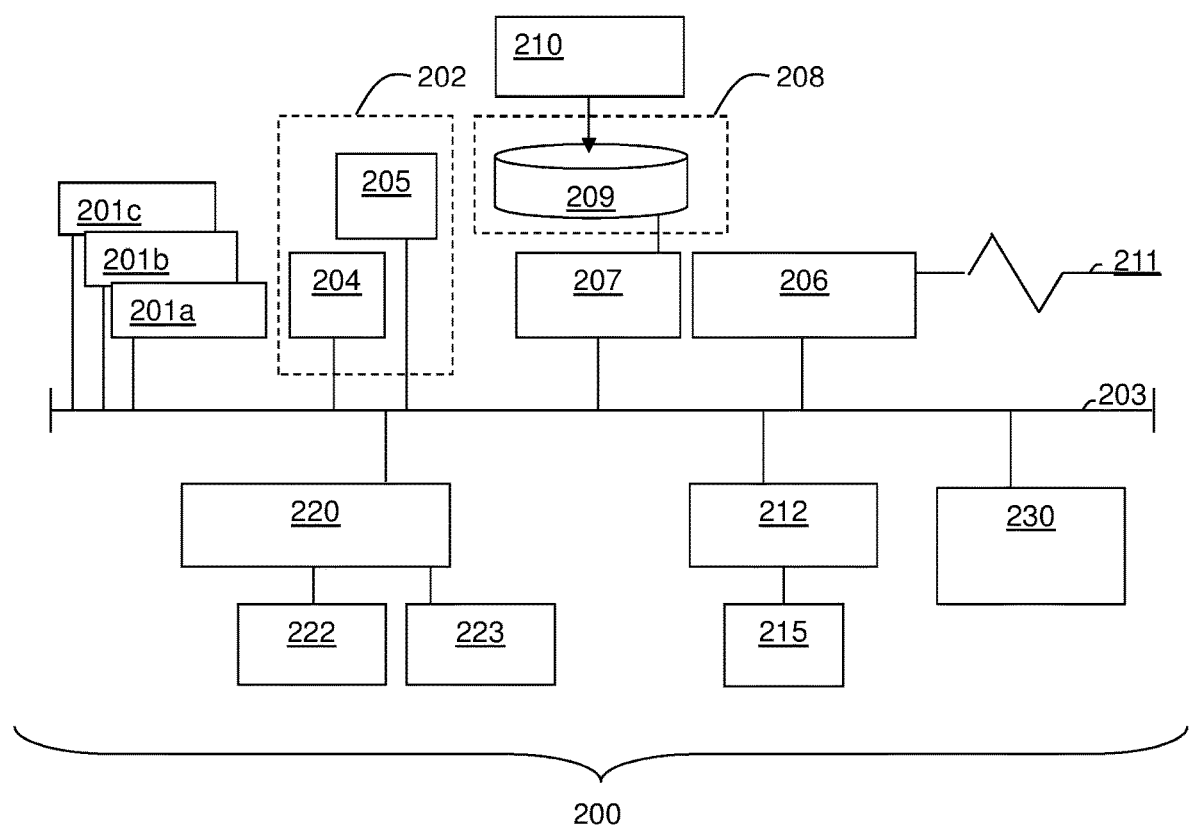
FIG. 2 is a block diagram illustrating one example of a processing system according to one or more embodiments.

In accordance with an exemplary embodiment, FIG. 2 illustrates a processing system 200 for implementing the teachings herein. The processing system 200 can form at least a portion of the one or more computing devices, such as server/Cloud 54B and/or vehicle on-board computer system 54N. The processing system 200 may include one or more CPUs (processors) 201a, 201b, 201c, etc. (collectively or generically referred to as processor(s) 201). Processors 201 are coupled to system memory 202 and various other components via a system bus 203. The system memory 202 can include a read only memory (ROM) 204, can include a random access memory (RAM) 205, and can include a basic input/output system (BIOS), which controls certain basic functions of the processing system 200.

FIG. 2 further depicts a network adapter 206 and an input/output (I/O) adapter 207 coupled to the system bus 203. The I/O adapter 207 may be a small computer system interface (SCSI) adapter that communicates with a mass storage 208, which can include a hard disk 209 and/or other storage drive or any other similar component. An operating system 210 for execution on the processing system 200 may be stored in the mass storage 208. The network adapter 206 interconnects the system bus 203 with an outside network 211 enabling the processing system 200 to communicate with other such systems.

A display adaptor 212 can connect a screen 215 (e.g., a display monitor) to the system bus 203 and may include a graphics adapter to improve the performance of graphics intensive applications and a video controller. In one embodiment, adapters 207, 206, and 212 may be connected to one or more I/O busses that are connected to the system bus 203 via an intermediate bus bridge. Suitable I/O buses for connecting peripheral devices such as hard disk controllers, network adapters, and graphics adapters typically include common protocols, such as the Peripheral Component Interconnect (PCI). Additional input/output devices are shown as connected to the system bus 203 via a user interface adapter 220. A camera 222 and a speaker 223 can all be interconnected to the system bus 203 via the user interface adapter 220, which may include, for example, a Super I/O chip integrating multiple device adapters into a single integrated circuit.

The processing system 200 may additionally include a graphics-processing unit 230. Graphics processing unit 230 is a specialized electronic circuit designed to manipulate and alter memory to accelerate the creation of images in a frame buffer intended for output to a display and/or for ascertaining and analyzing of a feature set. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including the system memory 202 and the mass storage 208, input means such as the camera 222, and output capability including the speaker 223 and the display 215. In one embodiment, a portion of the system memory 202 and the mass storage 208 collectively store the operating system 210 to coordinate the functions of the various components shown in FIG. 2.

Figure 3:
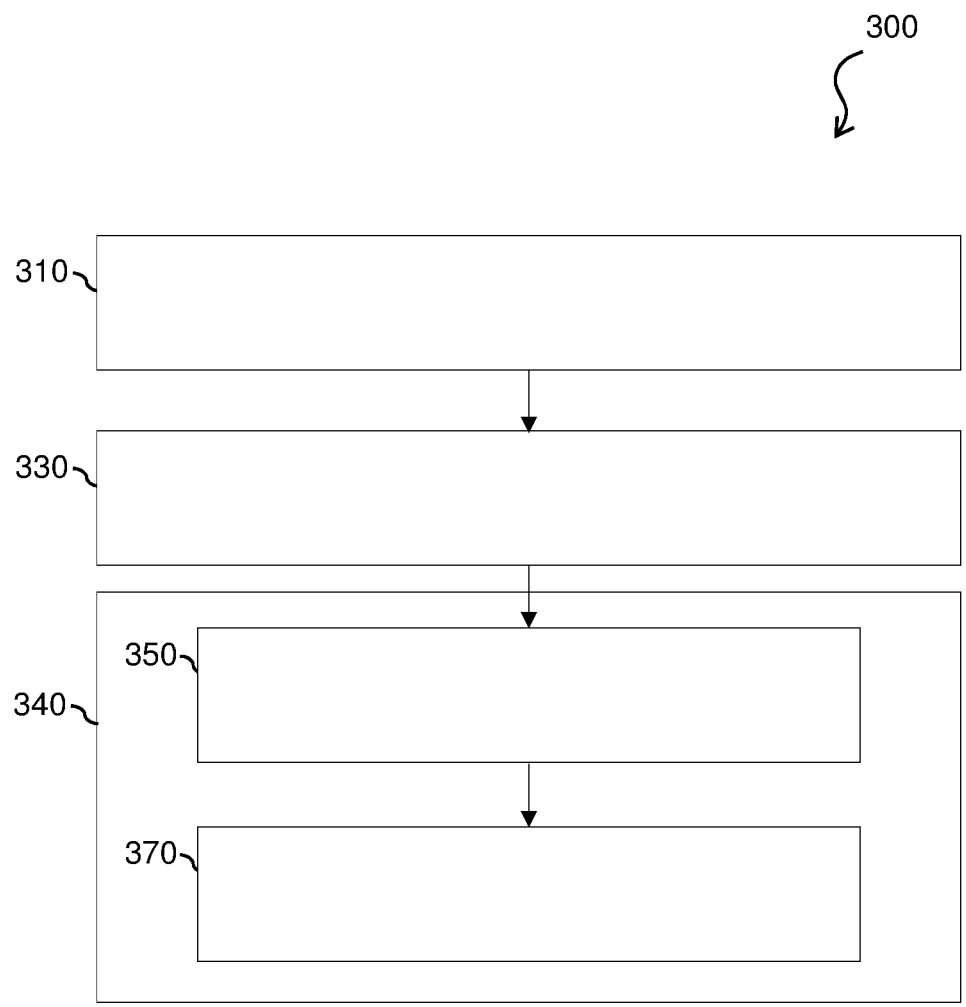
FIG. 3 depicts a flow diagram of a method for distributing processing resources across local and cloud-based systems with respect to the autonomous navigation according to one or more embodiments.

FIG. 3 depicts a flow diagram 300 of a method for distributing processing resources across local and cloud-based systems with respect to the autonomous navigation according to one or more embodiments. The method is executable by the processing system 200, which is local to a vehicle 55 (e.g., the vehicle on-board computer system 54N).

At block 310, the processing system 200 receives, as an input, a trip request. The trip request may optionally include a navigable route from an origin to a destination (e.g., an explicit route between a source and a destination). The trip request can be user provided and can include information with respect to the destination, such that the processing system 200 receives the trip request as a command to proceed to the destination. Note that the origin and the destination can be any separate physical locations defined by one or more of GPS coordinates, addresses, landmarks, and the like. Note also that the processing system 200 can operate without the navigable route, as the processing system 200 can entirely utilize feature sets described herein, including utilizing a feature set taken at an origin to begin a trip.

At block 330, the processing system 200 determines an initial location and direction information associated with the vehicle 55. The initial location and direction information are directly relative to the origin of the vehicle 55, and therefor to the origin of the trip request. For example, the processing system 200 can, in response to the trip request, capture a picture or a video of the vehicle 55 surroundings via the camera 222. The processing system 200 can derive a feature set from the picture itself or at least one frame within the video. A feature is a recognizable element (e.g., shape, square, corner, color, or the like) within a frame. A feature set is a combination of recognizable features within a frame. Thus, features sets are utilized to determine the initial location and direction information associated with the vehicle 55 based on an analysis of a frame captured at the origin of the trip request. Utilizing the derived feature set, the processing system 200 determines that the vehicle 55 is in a new location or that the vehicle 55 is in a previous location. To make this determination, the processing system 200 can compare previously captured feature sets to the derived feature set. If there are any matches between one of the previously captured feature sets and the derived feature set, then the vehicle 55 is determined to be in the previous location. Otherwise, the derived feature set can identify the new location. Note that if the new location is determine, the processing system 200 can forgo any loop determinations. Also, note that the operations of block 330 can be offloaded to the server/Cloud 54B.

Next, the vehicle 55 begins to travel according to the trip request (e.g., to the destination). While the vehicle 55 is traveling, at block 340, the processing system 200 receives one or more frames (e.g., captured by the camera 222) and analyzes these frames. This analysis includes extracting feature sets on a per frame basis to determine progressive location and direction information associated with the vehicle 55. According to one or more embodiments, the analysis includes determining location, distance, and speed information based on how a feature moves through a sequence of frames and/or how a feature set is altered through a sequence of frames. The analysis can be supplemented by GPS data.

To perform the analysis, the processing system 200 can utilize local processing resources (e.g., the processors 201 and/or the vehicle on-board computer systems 54N) or the processing resources of the cloud based systems (e.g., the server/Cloud 54B). Thus, rather than the processing system 200 proceeding with the analysis, the processing system 200 can estimate and/or determine an execution time for each of one or more computations respective to the analyzing of the one or more frames (as shown at block 350). In this regard, computations are identified and processing/computation costs (e.g., an amount of processing cycles needed to complete a computation) are associated with each computation. In general, some computations have predictable execution times, so a lower performance processor may be sufficient (or they may be conducted remotely via the server/Cloud 54B). Computations that have more valuable execution times may be conducted on a higher performance processor or run on the vehicle on-board computer systems 54N. For example, computations having a one-time cost and no latency or deadlines for returning data can be identified as proper for being conducted remotely via the server/Cloud 54B.

Turning now to FIG. 4, a table 400 of computation costs to implement the method of FIG. 3 is depicted according to one or more embodiments. The first column 401 of the table 400 lists different types of computations, and the computation costs with respect to each type can be based on a variety of factors. These factors include, but are not limited to, CPU/compute usage or average active CPU usage in percentages (the second column 402 of table 400), complexity to compute data for a particular component (the third column 403 of table 400), and/or latency requirements/deadlines needed to complete tasks associated with the component (the fourth column 404 of table 400).

Certain computations can operate on a continuous basis, such as vehicle tracking 410 and mapping of the vehicle 420 (note that tracking and mapping are usually perform at the vehicle 55). Other computations, such as loop detection 430, loop closure 440, pose-graph optimization 450, and full bundle adjustment (BA) 460, can run a one-time computation cost to conduct a repeated trip (e.g., loop closure 440 includes when a drift is detected, such as when a small number of frames are sent to the server/Cloud 54B and updates are sent back to the vehicle 55; pose-graph optimization 450 includes using key frames that are sent periodically to the cloud; and full bundle adjustments 460 occur at the end of the trip). Computations running a one-time cost tend not to have a required timeframe to return data. Further, because the computations running a one-time cost have no latency deadline to return data, data processing related to these computations can be conducted remotely from the vehicle 55, for example, via the server/Cloud 54B. Accordingly, processing resources associated with the vehicle on-board computer system 54N can be reduced and/or devoted to components, computation, and tasks that do have latency deadlines.

In accordance with one or more embodiments, the processing system 200 may also detect an available bandwidth of a connection between the server/cloud 54B and the vehicle on-board computer system 54N. That is, as bandwidth between the server/cloud 54B and the vehicle on-board computer system 54N can be limited or varied, any transfer of computations may be hindering to the overall determinations of the location and direction information. Thus, the available bandwidth (e.g., speed and capability of the connection) can be used to determine which computations to off-load. For example, the execution times can be supplemented by an amount of time to communicate computations remotely and receive respective data in return.

Returning to FIG. 3, at block 370, the processing system 200 can off-load the one or more computations to the processing resources of the server/Cloud 54B that is in communication with the vehicle on-board computer system 54N. In turn, processing system 200 utilizes the computation costs and/or bandwidth availability to prevent incorrectly off-loading task that will not be completed by a necessary time.

In accordance with one or more embodiments, the processing system 200 can be adaptive (e.g., adaptive off-loading). That is, the processing system 200 can perform adaptive off-loading where if a number of features that are in common starts to drop across frames, then the processing system 200 can solicit help to the server/cloud 54B. Note that output from SLAM can be location and direction information, so "where the vehicle is" can be relative to the origin and which direction the vehicle 55 is heading (e.g., each of these factors can be defined by three dimension, which equates to six values). Adaptive offloading can also include when the processing system 200 is receiving corrected results from a remote location and reduces the information/computations/processing tasks sent to and from the server/cloud 54B (e.g., in this regard, information can burst onto the server/cloud 54B).

In accordance with one or more embodiments, the processing system 200 can determine from the one or more frames that at least the vehicle 55 has previously traveled along its current course. More particularly, a loop can be a determination that the vehicle 55 has previously traveled along its current course based on a present package of frames and/or feature sets being compared to a previous package of frames and/or feature sets (whether beginning at the origin or mid travel). Loop detection assists with error correction. In general, as the processing system 200 is executing frame analysis, errors can appear and accumulate (e.g., sometimes this can be referred to or translated to drift, such as a drift from correct coordinates). Note that speed, weather, and other factors can cause a drift in a loop, such as a snow-covered terrain can be difficult to identify features of the video as compared to a clear weather day. Yet if an origin is the same as destination or if a path has been previously traveled, these errors can be resolved.

For example, as a travel loop, the processing system 200 can detect via the flow diagram 300 that a vehicle 55 can start in a driveway, go to a destination (e.g., an office building for work), and return to the driveway. The processing system 200 can further detect that a drift that shows that the vehicle 55 is 50 meters off at any point in the travel. The travel loop can be used to adjust the feature tracking across frames. Once the processing system 200 has an adjusted the feature tracking across frames, the processing system 200 can determine a more accurate position of the vehicle 55 based on these adjustments. That is, the processing system 200 can determine whether a vehicle 55 is on a travel loop, compare each frame based on feature extraction, and when the features deviate, the processing system 200 can correct or determine it is deviating from the travel loop.

Figure 5:
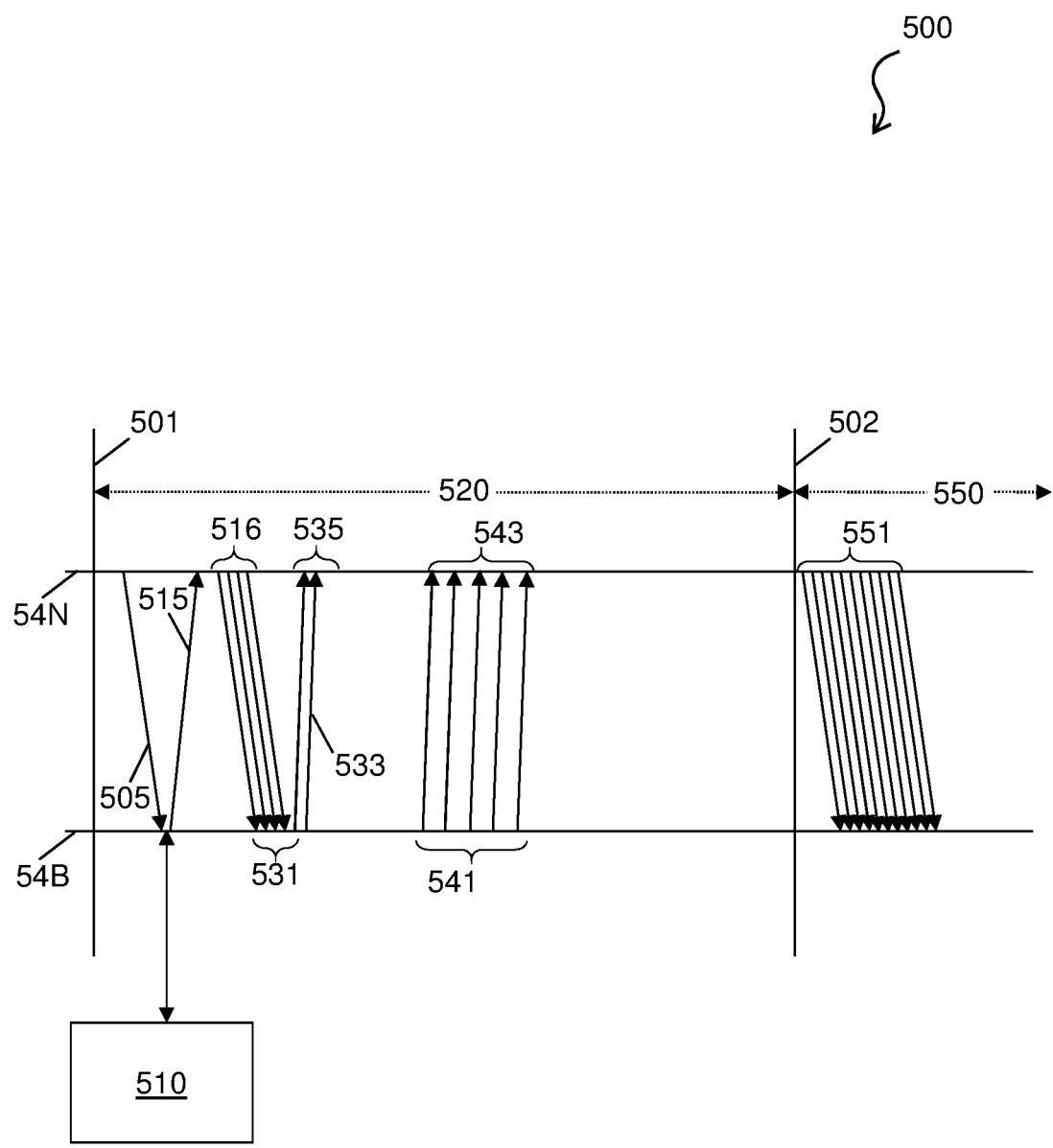
FIG. 5 depicts an exemplary interaction according to one or more embodiments.

Turning now to FIG. 5, an exemplary interaction 500, according to one or more embodiments, can be performed by the vehicle on-board computer system 54N and/or the server/cloud 54B, both of which can include computer-readable instructions for distributing processing resources across the vehicle on-board computer system 54N and the server/cloud 54B with respect to the autonomous navigation thereon. As a vehicle 55 begins to traverse between an origin 501 and a destination 502, a local map (e.g., feature set) stored by the vehicle on-board computer system 54N may not contain any feature set data because previous trip data was offloaded/transferred from the vehicle 55 to a remote location, for example, the server/cloud 54B. The vehicle on-board computer system 54N can send (e.g., arrow 505) a current feature set and/or a current GPS location associated with the vehicle's current location to the server/cloud 54B to determine (e.g., block 510) whether the server/cloud 54B contains any previous/old information (e.g., old feature set) associated with the current feature set and/or the current GPS location. If the server/cloud 54B does contain previous information, the server/cloud 54B can send (e.g., arrow 515) the information to the requesting vehicle on-board computer system 54N. Communication between the vehicle on-board computer system 54N and the server/cloud 54B to exchange (e.g., arrows 516) feature sets and/or GPS data can occur using, for example, cellular communications (e.g., 520).

In addition, while the vehicle 55 is traveling, sensors (e.g., the cameras 222) can be used to obtain frames (e.g., picture or video data; note that rich video assists with SLAM operations) related to road networks and extract features from the received image data. The vehicle on-board computer system 54N can analyze the image by running computations that operate on a continuous basis (e.g., tracking and mapping) and may also send the obtained image data to the server/cloud 54B for further analysis. The image data sent to the cloud may be a subset of the obtained image data (i.e., key frames). The key frames can be sent at different intervals in order to provide a full summary of content related to the obtained image data. Key frames subsequently received can contain frames which relate to feature changes/updates within the obtained image data. Communication between the vehicle on-board computer system 54N and the server/cloud 54B to exchange key frames can occur using, for example, cellular communications. Sending key frames to the server/cloud 54B can reduce a bandwidth load needed to transfer the obtained image data because the image data sent to the server/cloud 54B is a subset of the obtained image data.

The server/cloud 54B can use the received key frames to perform a loop detection (e.g., arrows 531). When a vehicle 55 is traveling along a route and enters an area that has previously been entered, the server/cloud 54B can analyze the received key frames from a current route traversal by comparing images of previous travel to images currently being received by the vehicle 55 (e.g., loop detection) and determine whether or not the received key frames match one or more key frames associated with past traversals. Then the server/cloud 54B can run computation on the received key frames (e.g., pose-graph optimization) to determine a better position information and send this information to the vehicle.

The vehicle on-board computer system 54N can determine whether the vehicle 55 is drifting from the loop (loop closure). Upon the determination of a loop closure the vehicle 55 sends one or more frames to the server/cloud 54B. The server/cloud 54B can run a loop closure computation to obtain a correction to be applied to the position information and sends the correction to the vehicle 55. The corrected position information can be used by the vehicle 55 to correct positioning (e.g., arrows 535) of the vehicle 55 on the local map (e.g., feature set) stored by the vehicle on-board computer system 54N. The corrected position determination can be used to optimize the position of the associated vehicle 55. Accordingly, having the determination occur at the server/cloud 54B allows for processing resources of the vehicle 55 to be devoted to other tasks. Communication between the vehicle on-board computer system 54N and the server/cloud 54B to conduct loop detection and loop closure can occur using, for example, cellular communications.

Upon the determination of a loop closure by the server/cloud 54B, the server/cloud 54B can also send (e.g., line section 541) one or more key frames stored by the server/cloud 54B to the vehicle 55. The receiving vehicle on-board computer system 54N can use the received one or more key frames to perform (e.g., line section 543) an incremental loop closure on the vehicle 55. The vehicle on-board computer system 54N can compare features associated with the one or more key frames received from the server/cloud 54B with features extracted from the one or more key frames obtained by the vehicle on-board computer system 54N to determine whether changes have occurred in a key frame associated with the same location. For example, the comparison can determine that a truck previously parked at a location along the navigable route is no longer parked at the location. Communication between the vehicle on-board computer system 54N and the server/cloud 54B to send and receive key frames can occur using, for example, cellular communications 530.

Upon reaching the destination 502 or reaching a location that allows for communications between the vehicle on-board computer system 54N and the server/cloud 54B with an increased bandwidth, for example, WIFI (e.g., 550), the vehicle on-board computer system 54N can transmit/offload (e.g., line section 551) all trip data from the vehicle 55 to the server/cloud 54B. Accordingly, the server/cloud 54B can run a more valuable computation (e.g., full bundle adjustment) offline and maintain data related to a recently traversed route in addition to data related to previous route traversals thereby saving storage space on the vehicle 55. In addition, by offloading SLAM components/operations (e.g., GPS localization, loop detection, and sending key frames) from the vehicle 55 to a remote location for computation, processing resources of the vehicle 55 can be spared from compute intensive processes related to SLAM.

Figure 6:
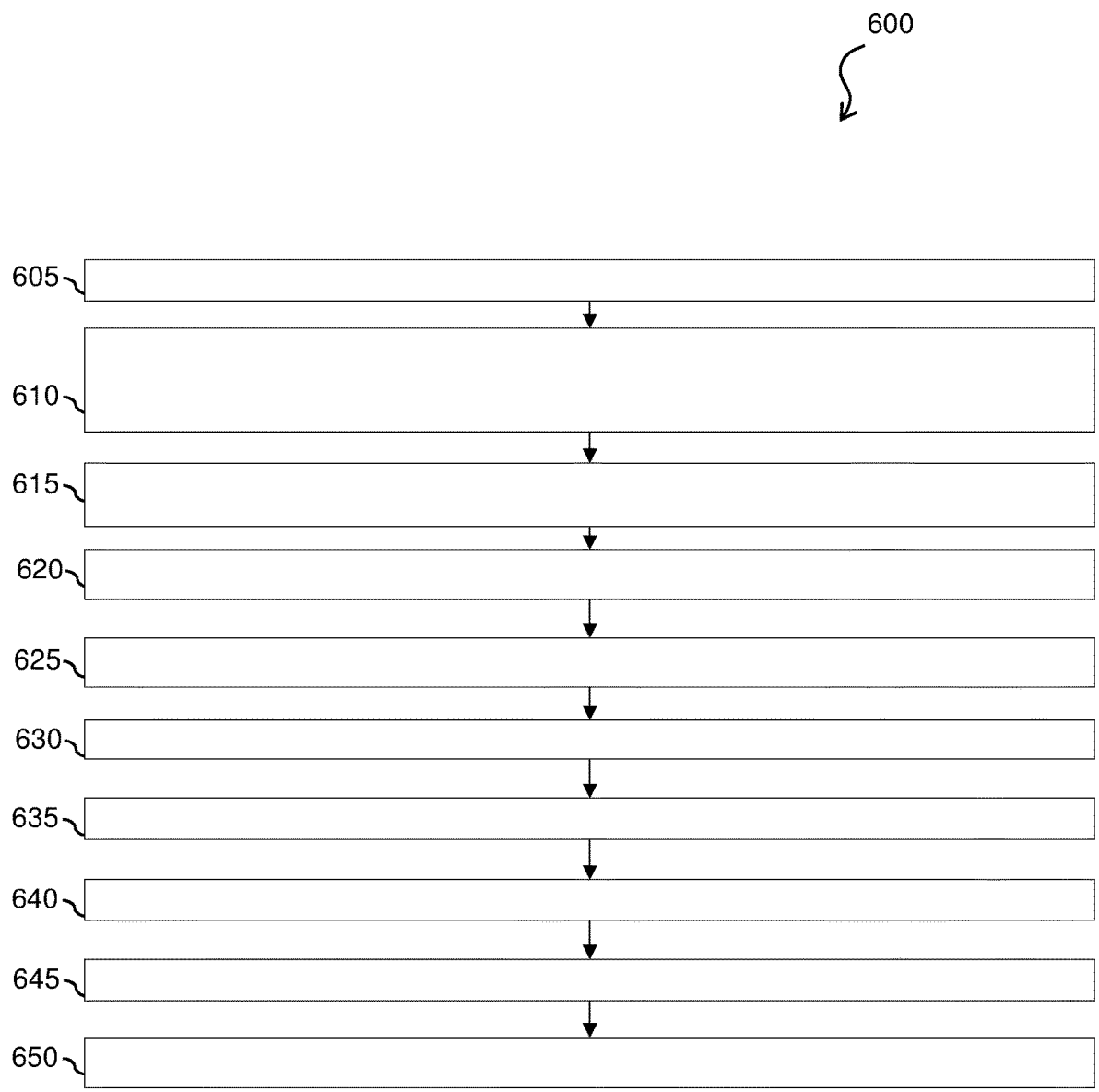
FIG. 6 depicts a flow diagram of a method for distributing processing resources across local and cloud-based systems with respect to the autonomous navigation according to one or more embodiments.

In accordance with another embodiment, FIG. 6 depicts a flow diagram 600 of a method for distributing processing resources across local and cloud-based systems with respect to the autonomous navigation. The flow diagram 600 begins at block 605, wherein the vehicle on-board computer system 54N of a vehicle 55 can receive a trip request (e.g., a navigable route from a designated location to a destination) from a user/driver. At block 610, the vehicle on-board computer system 54N can determine a navigable route and send a request for feature set data associated a current or designated location to the server/cloud 54B. At block 615, the server/cloud 54B can also calculate the navigable route and send feature set data for the requested location to the requesting vehicle on-board computer system 54N. At block 620, the vehicle on-board computer system 54N sends one or more frames (e.g., key frames) to the server/cloud 54B.

At block 625, the server/cloud 54B can perform loop detection using the received key frames and stored key frames. At block 630, the server/cloud 54B can send corrected position information/data to the vehicle on-board computer system 54N based on the performed loop detection. The corrected position information/data can be used by the vehicle on-board computer system 54N to more accurately reflect the location of the vehicle 55 on a local map stored by the vehicle 55. At block 635, the server/cloud 54B can send the vehicle on-board computer system 54N a subset of the frames (e.g., key frames) from past trips which are associated with portions of the determined navigable route. At block 640, the server/cloud 54B can also use the received subset of key frames to perform an incremental loop closure for the determined navigable route.

At block 645, the server/cloud 54B can send a subset of frames from previous trips, that were used to perform the loop closure to the vehicle on-board computer system 54N. At block 650, the vehicle on-board computer system 54N can send/offload all trip data (i.e., sensor information, image data and traffic data) upon reaching the destination or at locations along the navigable route that provide a WIFI connection. In addition, aspects of method can be conducted repeatedly throughout the trip. Accordingly, the method performs a hybrid SLAM process which causes the server/cloud 54B to perform the compute intensive portions of SLAM (i.e., loop detection, loop closure, etc.).

Figure 7:
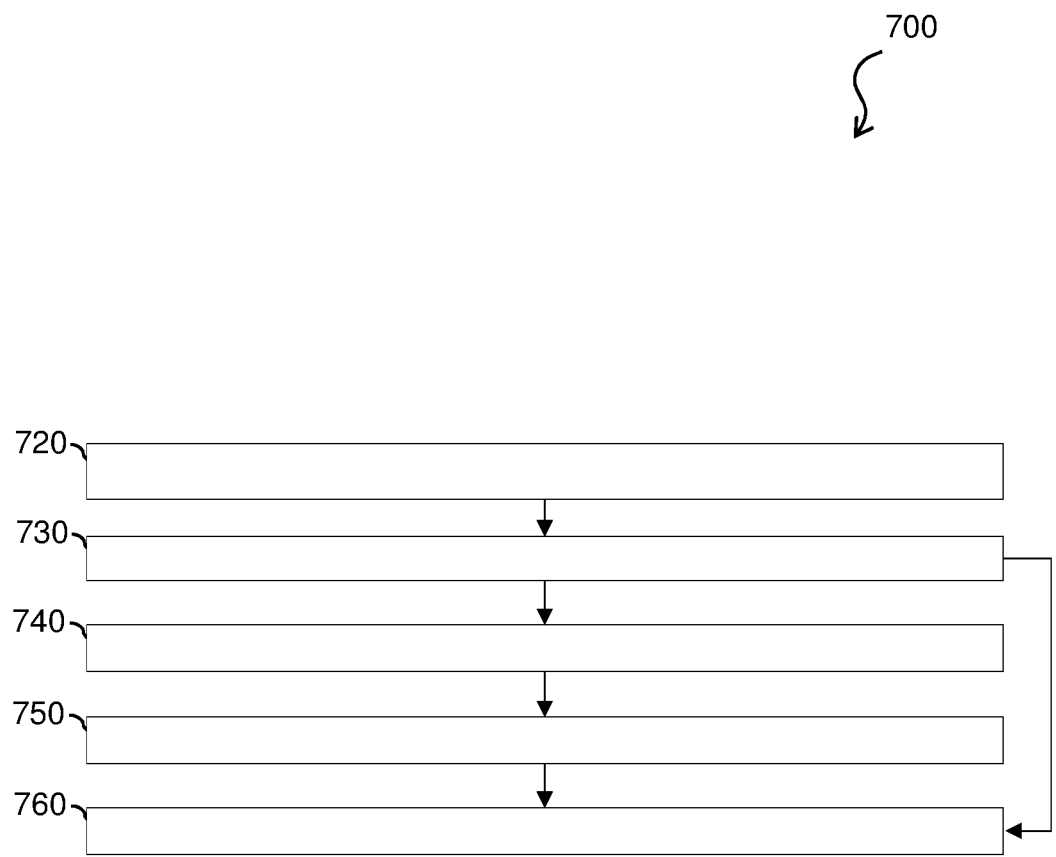
FIG. 7 depicts a flow diagram for distributing processing resources across local and cloud-based systems with respect to the autonomous navigation according to one or more embodiments.

In accordance with another embodiment, FIG. 7 depicts a flow diagram 700 for distributing processing resources across local and cloud-based systems with respect to the autonomous navigation according to one or more embodiments. The flow diagram 700 begins at block 720, where the vehicle on-board computer system 54N sends GPS coordinates to the server/cloud 54B. Note that if connectivity is lost, then the vehicle on-board computer system 54N stops sending data. At block 730, if feature sets are not available with respect to the GPS coordinates, then the flow diagram proceeds to block 740.

At block 740, while the server/cloud 54B has not detected a loop and if the bandwidth is below a threshold (e.g., the speed of the connection is lower than a predefined value), the vehicle on-board computer system 54N sends compressed key frames to the server/cloud 54B. Note that the bandwidth threshold can identify a failure scenario when the server/cloud 54B does not detect loop. Note that if connectivity is lost, then the vehicle on-board computer system 54N stops sending data.

At block 750, while the travel continues and a timer has not expired), the vehicle on-board computer system 54N sends one compressed key frame to the server/cloud 54B if a significant change is detected in the key frame.

At block 730, if feature sets are available with respect to the GPS coordinates, then the flow diagram proceeds to block 760. At block 760, if an output from the server/cloud 54B is received, then the vehicle on-board computer system 54N updates local frames with corrections and interpolates corrections for new key frames.

Figure 8:
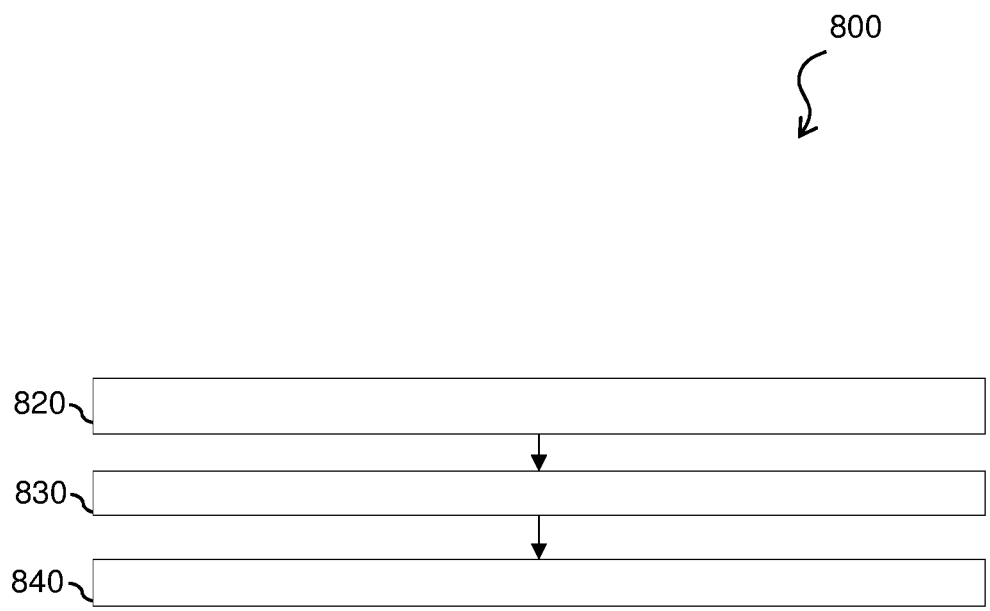
FIG. 8 depicts a flow diagram for distributing processing resources across local and cloud-based systems with respect to the autonomous navigation according to one or more embodiments.

In accordance with another embodiment, FIG. 8 depicts a flow diagram 800 for distributing processing resources across local and cloud-based systems with respect to the autonomous navigation according to one or more embodiments. The flow diagram 800 begins at block 820, where if GPS coordinates are received by the server/cloud 54B and corresponding data is available, then the server/cloud 54B notifies the vehicle on-board computer system 54N with a positive response ("Yes"). Otherwise, the server/cloud 54B sends a negative response ("No").

At block 830, the server/cloud 54B determines if a key frame message is received and that the message does not include a merge operation, then the server/cloud 54B detects where in the loop the vehicle 55 is located from a previous trip, finds any drift using similarity transformation, applies a correction to close the loop, and sends a corrected output and transformation to the vehicle on-board computer system 54N. At block 840, the server/cloud 54B merges local and cloud data structures (e.g., feature sets, poses in frames, etc.) and performs a global optimization (e.g., essential graph optimization, bundle adjustment) to correct the route/travel/previous trip.

Technical effects and benefits of the disclosed embodiments include, but are not limited to, reducing processing resources local to a vehicle by offloading some operations that do not have latency deadlines to a remote resource from processing and storage in memory. For example, the embodiments disclosed herein describe a system that can leverage remote resources to perform aspects of SLAM thereby freeing local resources associated with a vehicle to perform other tasks. In addition, SLAM accuracy of vehicle positioning is improved by causing a global bundle adjustment to replace old frames associated with a previous trip with new frames associated with a current trip and sending key frames to the vehicle in order for a more accurate location representation in a local map stored by the vehicle. The embodiments disclosed herein also do not require synchronization or communication between the active sensors.

In addition to one or more of the features described herein, one or more aspects of the described method recognize that the vehicle utilizes SLAM during the trip. Another aspect of the method is that SLAM includes a tracking component, a mapping component, a loop detection component, a loop closure component, a pose-graph optimization component and a bundle adjustment component. Another aspect of the method is that operations associated with at least one of the loop detection component, the loop closure component, the pose-graph optimization component and a bundle adjustment component are completed by a resource remote to the vehicle. Another aspect of the method is a recognition that no latency deadline exists for each of the at least one of the loop detection component, the loop closure component, the pose-graph optimization component and a bundle adjustment component. Another aspect of the method is that the corrections associated with a local map are based on a comparison of features extracted from frames generated by the vehicle in response to the trip with the sent one or more key frames. Another aspect of the method includes sending, by the processor, one or more key frames from the vehicle, wherein the one or more key frames are used to determine that the vehicle is traveling along a portion of the navigable route which has previously been traveled by the vehicle.

The method further includes receiving, by the processor, location information associated with the vehicle. The method further includes determining, by the processor, the navigable route. The method further includes receiving, by the processor, an indication that the vehicle is traveling along a portion of the navigable route which has previously been traveled by the vehicle. The method further includes receiving, by the processor, one or more key frames, wherein the one or more key frames are used for map corrections associated with a local map of the vehicle when the vehicle is traveling along a portion of the navigable route which has previously been traveled by the vehicle. The method further includes sending, by the processor, data associated with the trip when the vehicle reaches the destination.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method executable by a processor coupled to a memory, the processor being local to a vehicle, the method comprising:

determining, by the processor, initial location and direction information associated with the vehicle at an origin of a trip request;

receiving, by the processor, one or more frames captured while the vehicle is traveling along a navigable route relative to the trip request;

determining from the one or more frames whether a portion of the navigable route has been previously traveled by the vehicle;

based on the portion of the navigable route having been previously traveled, receiving one or more reference frames associated with the portion of the navigable route, and determining a number of features in common between the one or more frames and the one or more reference frames;

estimating, by the processor, an execution time for each of one or more computations respective to an analyzing of the one or more frames, wherein the execution time is based on the number of features in common; and off-loading, by the processor, the one or more computations to processing resources of a cloud-based system that is in communication with the processor of the vehicle in accordance with the corresponding execution times.

2. The method of claim 1, wherein the off-loading of the one or more computations comprises:
detecting a bandwidth of a connection between the cloud-based system and the processor of the vehicle; and
off-loading the one or more computations to the processing resources in accordance with the bandwidth.

3. The method of claim 1, wherein the analyzing of the one or more frames comprises extracting a feature set on a per frame basis to determine progressive location and direction information associated with the vehicle.

4. The method of claim 1, wherein the off-loading is adaptive in accordance with the analyzing of the one or more frames.

5. The method of claim 1, the method further comprising receiving, as an input, the trip request comprising the navigable route from the origin to a destination.

6. The method of claim 1, the method further comprising determining the initial location and direction information associated with the vehicle based on an analysis of a frame captured at the origin of the trip request.

7. The method of claim 1, the method further comprising autonomously navigating the vehicle based at least on the one or more computations.

8. A computer program product comprising a computer readable storage medium having program instructions embodied therewith, the program instructions executable by a processor coupled to a memory, the processor being local to a vehicle, the program instructions executable by the processor to cause operations comprising:

determining initial location and direction information associated with the vehicle at an origin of a trip request;

receiving one or more frames captured while the vehicle is traveling along a navigable route relative to the trip request;

determining from the one or more frames whether a portion of the navigable route has been previously traveled by the vehicle;

based on the portion of the navigable route having been previously traveled, receiving one or more reference frames associated with the portion of the navigable route, and determining a number of features in common between the one or more frames and the one or more reference frames;

estimating an execution time for each of one or more computations respective to an analyzing of the one or more frames, wherein the execution time is based on the number of features in common; and off-loading the one or more computations to processing resources of a cloud-based system that is in communication with the processor of the vehicle in accordance with the corresponding execution times.

9. The computer program product of claim 8, wherein the off-loading of the one or more computations comprises:
detecting a bandwidth of a connection between the cloud-based system and the processor of the vehicle; and
off-loading the one or more computations to the processing resources in accordance with the bandwidth.

10. The computer program product of claim 8, wherein the analyzing of the one or more frames comprises extracting a feature set on a per frame basis to determine progressive location and direction information associated with the vehicle.

11. The computer program product of claim 8, wherein the off-loading is adaptive in accordance with the analyzing of the one or more frames.

12. The computer program product of claim 8, the program instructions executable by the processor to cause operations comprising receiving, as an input, the trip request comprising the navigable route from the origin to a destination.

13. The computer program product of claim 8, the program instructions executable by the processor to cause operations comprising determining the initial location and direction information associated with the vehicle based on an analysis of a frame captured at the origin of the trip request.

14. The computer program product of claim 8, the program instructions executable by the processor to cause operations comprising autonomously navigating the vehicle based at least on the one or more computations.

15. A system comprising a processor and a memory storing program instructions thereon, the processor being local to a vehicle, the program instructions executable by the processor to cause the system to perform:

determining initial location and direction information associated with the vehicle at an origin of a trip request;

receiving one or more frames captured while the vehicle is traveling along a navigable route relative to the trip request;

determining from the one or more frames whether a portion of the navigable route has been previously traveled by the vehicle;

based on the portion of the navigable route having been previously traveled, receiving one or more reference frames associated with the portion of the navigable route, and determining a number of features in common between the one or more frames and the one or more reference frames;

estimating an execution time for each of one or more computations respective to an analyzing of the one or more frames, wherein the execution time is based on the number of features in common; and off-loading the one or more computations to processing resources of a cloud-based system that is in communication with the processor of the vehicle in accordance with the corresponding execution times.

16. The system of claim 15, wherein the off-loading of the one or more computations comprises:
detecting a bandwidth of a connection between the cloud-based system and the processor of the vehicle; and
off-loading the one or more computations to the processing resources in accordance with the bandwidth.

17. The system of claim 15, wherein the analyzing of the one or more frames comprises extracting a feature set on a per frame basis to determine progressive location and direction information associated with the vehicle.

18. The system of claim 15, wherein the off-loading is adaptive in accordance with the analyzing of the one or more frames.

19. The system of claim 15, the program instructions executable by the processor to cause the system to perform receiving, as an input, the trip request comprising the navigable route from the origin to a destination.

20. The system of claim 15, the program instructions executable by the processor to cause the system to perform determining the initial location and direction information associated with the vehicle based on an analysis of a frame captured at the origin of the trip request.

* * * * *